United States Patent
Nielsen et al.

(10) Patent No.: US 9,711,958 B2
(45) Date of Patent: Jul. 18, 2017

(54) WIRING HARNESS INSTALLATION GUIDE DEVICE

(71) Applicant: Sumitomo Electric Wiring Systems, Inc., Northville, MI (US)

(72) Inventors: Chad Nielsen, Lake Orion, MI (US); Nathan Zukowski, Ann Arbor, MI (US); Jacob Szeluga, Mt. Sterling, KY (US)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 14/282,155

(22) Filed: May 20, 2014

(65) Prior Publication Data

US 2015/0340852 A1    Nov. 26, 2015

(51) Int. Cl.
| | |
|---|---|
| *H02G 3/22* | (2006.01) |
| *H02G 3/08* | (2006.01) |
| *B60R 16/02* | (2006.01) |
| *H02G 3/06* | (2006.01) |
| *F16L 5/00* | (2006.01) |
| *F16L 5/10* | (2006.01) |

(52) U.S. Cl.
CPC .......... *H02G 3/22* (2013.01); *B60R 16/0222* (2013.01); *H02G 3/083* (2013.01); *H02G 3/088* (2013.01); *F16L 5/00* (2013.01); *F16L 5/10* (2013.01); *H02G 3/0633* (2013.01); *H02G 3/0658* (2013.01)

(58) Field of Classification Search
CPC .......... H02G 3/22; H02G 3/083; H02G 3/088; H02G 3/0633; H02G 3/0658; F16L 5/00; F16L 5/10; F16L 5/021; E04B 1/947; E04B 1/948; F16B 5/0642; F16B 5/0664; B60R 16/0222

USPC ...... 174/650, 668; 156/60, 71, 91, 160, 165, 156/293, 294; 248/46, 519, 523, 534
See application file for complete search history.

(56) References Cited

U.S. PATENT DOCUMENTS

| | | | | |
|---|---|---|---|---|
| 3,424,856 | A * | 1/1969 | Coldren | H02G 3/0633 16/2.5 |
| 3,768,115 | A * | 10/1973 | Hoffmann | F16C 11/04 16/2.1 |
| 6,058,562 | A * | 5/2000 | Satou | B60R 16/0222 16/2.1 |
| 6,372,995 | B1 * | 4/2002 | Mochizuki | B60R 16/0222 174/152 G |
| 6,757,945 | B2 * | 7/2004 | Shibuya | A47G 27/0418 16/8 |

(Continued)

*Primary Examiner* — Ishwarbhai B Patel
*Assistant Examiner* — Paresh Paghadal
(74) *Attorney, Agent, or Firm* — Gerald E. Hespos; Michael J. Porco; Matthew T. Hespos (57) ABSTRACT

A guide device (10) is provided for guiding a wiring harness (32) through an aperture (26) in a panel (24). The guide device (10) has a substantially tubular sidewall (12) with opposite front and rear ends (14, 16). Portions of the sidewall (12) adjacent the front end (14) are dimensioned to fit in the aperture (26). The sidewall (12) flares out toward the rear end (16). A slit (22) extends from the front end (14) of the sidewall (12) to the rear and (16) thereof. The front end (14) of the guide device (10) can be mounted in the aperture (26) so that the wiring harness (32) can be guided into the outwardly flared rear end (16) and through the aperture (26). The slit (22) enables the sidewall (12) to be biased open at the slit so that the guide device (10) can be separated from the wiring harness (32).

9 Claims, 10 Drawing Sheets

(56) References Cited

U.S. PATENT DOCUMENTS

| | | | | |
|---|---|---|---|---|
| RE38,788 E | * | 9/2005 | Satou | F16L 5/10 |
| | | | | 16/2.1 |
| 9,136,679 B1 | * | 9/2015 | Gretz | H02G 3/0418 |
| 2001/0044984 A1 | * | 11/2001 | Ono | B60R 16/0222 |
| | | | | 16/2.5 |
| 2003/0062694 A1 | * | 4/2003 | Uchida | B60R 16/0222 |
| | | | | 277/634 |
| 2004/0206857 A1 | * | 10/2004 | Barr | F16L 3/04 |
| | | | | 248/74.1 |
| 2009/0218132 A1 | * | 9/2009 | Delakowitz | H02G 3/22 |
| | | | | 174/669 |
| 2010/0300749 A1 | * | 12/2010 | Adachi | B60R 16/0222 |
| | | | | 174/84 C |
| 2013/0213546 A1 | * | 8/2013 | Cichon, Jr. | F16L 5/00 |
| | | | | 156/60 |
| 2014/0174818 A1 | * | 6/2014 | Bingham, Jr. | H02G 3/22 |
| | | | | 174/668 |

\* cited by examiner

WIRING HARNESS INSTALLATION GUIDE DEVICE

BACKGROUND

1. Field of the Invention

The invention relates to a device to facilitate installation of a wiring harness in an automotive vehicle without damaging the wiring harness.

2. Description of the Related Art

Automotive vehicles continue to have increasingly complex arrays of wiring harnesses to deliver electric power from power sources in a vehicle to control circuitry and from the control circuitry to a wide range of electrically powered components in the vehicle. The typical wiring harness has an array of wires bundled together. The wires of a wiring harness may be held in the bundled array by wire ties, tape or sections of corrugated tubing. Each wire typically extends to a terminal fitting and plural terminal fittings typically are mounted into electrical connectors that are configured to mate with other electrical connectors.

The electric power sources typically are disposed in a part of the vehicle that is outside the passenger compartment of the vehicle, such as in the engine compartment. Many of the electrically powered components of the vehicle are within the passenger compartment or have controls within the passenger compartment. As a result, wiring harnesses, including the wires and the connectors mounted to the ends of the wires, often must pass through the vehicular panels that separate the passenger compartment from the engine compartment or trunk of the vehicle. The panels that separate the passenger compartment from the engine compartment or trunk are formed with apertures to accommodate the passage of the wiring harnesses. Grommets typically are mounted around the section of the wiring harness that passes through the panel in the vehicle. Outer peripheral regions of the grommets engage the periphery of the aperture in the panel to provide weatherproofing between the passenger compartment and the engine compartment or trunk of the vehicle.

The space available in an automotive vehicle is extremely limited in view of the large number of components that compete for the available space. As a result, the space available for routing a wiring harness through a vehicle is very limited and often is dictated by the space requirements of mechanical components of the vehicle that are less flexible than the wiring harness. The space restrictions in a vehicle often determined the size of the opening in a panel through which a wiring harness must pass. The placement of a wiring harness in a vehicle typically is carried out manually by workers who may not have convenient access to the required locations. As a result, passing the relatively flexible wiring harness and the connectors through a small poorly accessible opening in a panel can be difficult. The panels through which a wiring harness must pass typically are made of metal and the apertures in the panel typically have sharp edges. The wires of the wiring harness, on the other hand, typically have a thin layer of insulating coating surrounding a conductive core. The coating is intended to avoid short-circuits and to prevent moisture from affecting the conductive core. However, inserting the wiring harness through a small hole in a vehicular panel creates the potential for damage to the insulating coating on the respective wires of the wiring harness. The connectors at the ends of the wires of the wiring harness typically have cross-sectional areas that exceed the cross-sectional area of the wire bundle. Thus the connectors easily are caught on the panel and particularly on a burring projection that generally surrounds the aperture in the panel.

The manufacturers of wiring harnesses and the workers who assemble the wiring harness into a vehicle have been aware of the potential for damage to the wires of a wiring harness as the wiring harness is being passed through an aperture in a vehicular panel. As a result, the manufacturers of wiring harnesses often ship the wiring harness to the automobile assembly site with a textile sheet that has a hook and loop fastening arrangement. The assembly workers mount the textile sheet around the part of the wiring harness that is to be passed through the aperture in the panel. These textile sheets are returned periodically to the wiring harness manufacturer. The textile sheets then are laundered and used again with another wiring harness. The textile sheets generally work well if mounted properly on the wiring harness. However, the textile sheet can be moved or disengaged during the mounting process. Furthermore, the collection, return and laundering of the used textile sheets complicates the already complex manufacturing procedures and there are corresponding cost increases.

Accordingly, an object of the invention is to provide an inexpensive and easily used device for passing a wiring harness through a panel in a vehicle without a risk of damage to the insulating coating on the wires of the wiring harness.

SUMMARY OF THE INVENTION

The invention relates to a device to facilitate guiding a wiring harness through an aperture in a panel of a vehicle. The device generally resembles a funnel with opposite first and second ends and a sidewall extending between the ends. The sidewall defines an opening extending longitudinally from the first end to the second end. A slit, and possible more than one slit, is formed through the sidewall and extends from the first end to the second end. The slit forms first and second opposed side edges on opposite sides of the slit and extending from the first end of the device to the second end thereof. The sidewall is formed from a resiliently deflectable material so that the sidewall can be deformed for widening the slit sufficiently for the opposite side edges of the slit to pass over the wiring harness. The sidewall then will resiliently return to an undeflected condition where the opposed side edges formed by the slit are in substantially abutting engagement with one another. In other embodiments, the sidewall may be divided diametrically in half and may have snap connections or the like so that the sidewall halves can be assembled and disassembled relative to the panel and the wiring harness.

The sidewall of the device has opposite inner and outer circumferential surfaces. The inner circumferential surface at locations adjacent the first end of the device is sufficiently large to accommodate the wiring harness therein. The outer circumferential surface at locations adjacent the first end substantially conforms to the inside dimension of the aperture through the panel. Thus, the first end of the device can be telescoped into the aperture in the panel and the wiring harness can be passed through inner circumferential surface of the device and beyond the first end of the device.

Portions of the device adjacent the first end may define a short substantially cylindrical tube. However, the sidewall flares out toward the second end of the device. The outwardly flared part of the sidewall in proximity to the second end of the device may define a substantially frustoconical shape. Thus, a leading end of the wiring harness, including the connectors mounted to the wires, can be guided into the cross-sectionally large frustoconical second end of the device and through the cross-sectionally small cylindrical first end of the device.

The substantially cylindrical part of the sidewall of the device adjacent the first end preferably has an outside diameter conforming to the inside diameter of the aperture through the panel. Additionally, the substantially cylindrical part of the sidewall of the device adjacent the first end preferably has a length substantially equal to or slightly greater than the thickness of the panel. As a result, the cylindrical part of the sidewall can be retained frictionally in the aperture of the panel. In many embodiments, the panel may have a short cylindrical burring wall surrounding the aperture. In these situations, the guide device may be formed with a groove facing toward the panel. The groove may be disposed and dimensioned to receive the burring wall as the device is mounted to the panel. The engagement of the burring wall with the groove holds the guide device removably on the panel.

The sidewall of the device preferably includes a plurality of supports projecting on the outer circumferential surface substantially adjacent the cylindrical part of the sidewall. The supports may be hollow to avoid large masses of molded resin that could lead to sink marks during cooling of the molded resin. Each hollow support may have an opening facing toward the first end. Magnets optionally may be mounted in at least certain of the hollow supports to enable magnetic retention of the guide device on the metal panel. The supports have stop surfaces facing toward the first end of the device. The stop surfaces preferably are disposed in a common radially aligned plane. Additionally, the supports define a cross-sectional dimension that exceeds the inside diameter of the aperture through the panel. As a result, the stop surfaces contact a surface of the panel to limit the insertion distance of the first end of the sidewall into the aperture in the panel.

Reinforcing webs preferably extend out from the supports to the second end of the device. The reinforcing webs preferably are joined unitarily to the supports and to the outer circumferential surface of the sidewall and preferably define substantially radially aligned planes. The reinforcing webs prevent the frustoconical parts of the sidewall from deforming in response to forces generated as the wiring harness is inserted through the device and through the aperture in the panel.

First and second abutment projections preferably extend out from the outer surface of the sidewall at locations adjacent the respective first and second edges that defined the slit. The projections further extend along the frustoconical part of the sidewall toward the second end of the sidewall. However, the projections are not formed on the substantially cylindrical part of the sidewall adjacent the first end so that the substantially cylindrical portion of the sidewall can telescope into the aperture in the panel.

The substantially cylindrical portion of the sidewall can be provided with locking protrusions spaced from the stop surfaces by a distance substantially equal to the thickness of the panel. Thus, the substantially cylindrical portion of the sidewall can be snapped into removable engagement with the panel.

As noted above, the panel is likely to have an annular burring flange projecting from the plane of the panel. The guide device may include a groove facing toward the first end of the guide device and disposed inward of the supports. The groove is configured to engage with the annular burring flange on the panel. The engagement of the groove with the annular burring flange may function to limit the axial extent of movement of the cylindrical portion into the aperture in the panel and may help to retain the device removably on the panel.

The invention also relates to a method for mounting a wiring harness through an aperture in a panel. The method includes providing a wiring harness and a panel with an aperture dimensioned to accommodate the wiring harness. The method also comprises providing a longitudinally slit funnel-shaped guide device with a cross-sectionally small first end and a cross-sectionally large second end. The method proceeds by removably mounting the cross-sectionally small first end of the funnel-shaped device into the aperture in the panel so that the cross-sectionally large second end of the funnel-shaped guide device projects from the panel. The method continues by guiding the end of the wiring harness into the cross-sectionally large second end of the funnel and through the aperture in the panel. The method then includes removing the funnel-shaped guide device from the aperture in the panel by sliding the funnel-shaped guide device along the wiring harness. The funnel-shaped guide device then is widened at opposite sides of the slit so that the funnel-shaped guide device can be removed from the wiring harness. A grommet may be mounted on the wiring harness and may be slid longitudinally along the wiring harness and into engagement with the panel at the aperture to provide sealing between the panel and the wiring harness.

DETAILED DESCRIPTION OF THE PREFERRED EMBODIMENT

A guide device in accordance with the subject invention is illustrated in FIGS. 1-11 and is identified generally by the numeral 10. The device 10 preferably is formed unitarily from a thermoplastic resin and has a short generally tubular side wall 12 with opposite front and rear ends 14 and 16 and opposite inner and outer circumferential surfaces 18 and 20. However, a single longitudinal slit 22 is formed through the tubular sidewall 12 from the inner circumferential surface 18 to the outer circumferential surface 20 and extends from the front end 14 to the rear end 16 of the guide device 10. The slit 22 has a curved radius at the front end 14 of the guide device 10 to facilitate the resilient opening of the guide device 10 when the guide device 10 is being removed from the wiring harness 34. In other embodiments, two diametrically disposed slits may be provided to define a bifurcated guide device that can be separated or assembled as needed. The two halves of this alternate guide device may have locking structures for releasably holding the opposed halves of the alternate guide device in an assembled condition.

Figure 11:
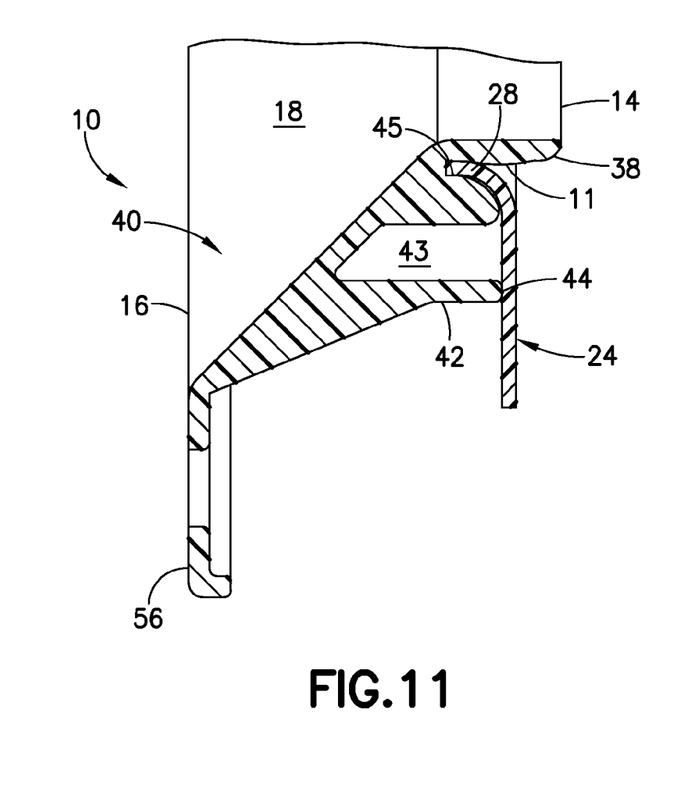
FIG. 11 is a cross-sectional view taken along line 11-11 in FIG. 2.

The guide device 10 is intended for use with a panel 24, such as a panel that separates a passenger compartment of an automotive vehicle from an engine compartment or trunk of the vehicle. The panel 24 is formed with an aperture 26 therethrough and the aperture may have an annular burring wall or flange 28 generated during formation of the aperture 26 and extending from a first surface 30 of the panel 24, as shown in FIG. 11. The guide device 10 is intended to facilitate insertion of a wiring harness 32 through the aperture 26 in the panel. In this regard, the wiring harness 32 includes a bundle of wires 34 and a grommet 36 mounted on the bundle of wires 34 to provide sealing between the wires 34 and the panel 24. Additionally, connectors (not shown) are mounted to ends of the wires 34. As noted above, the cross-sectionally large connectors are particularly prone to being caught on the burring wall 28 or on the surface 30 of the panel 24.

Figure 8:
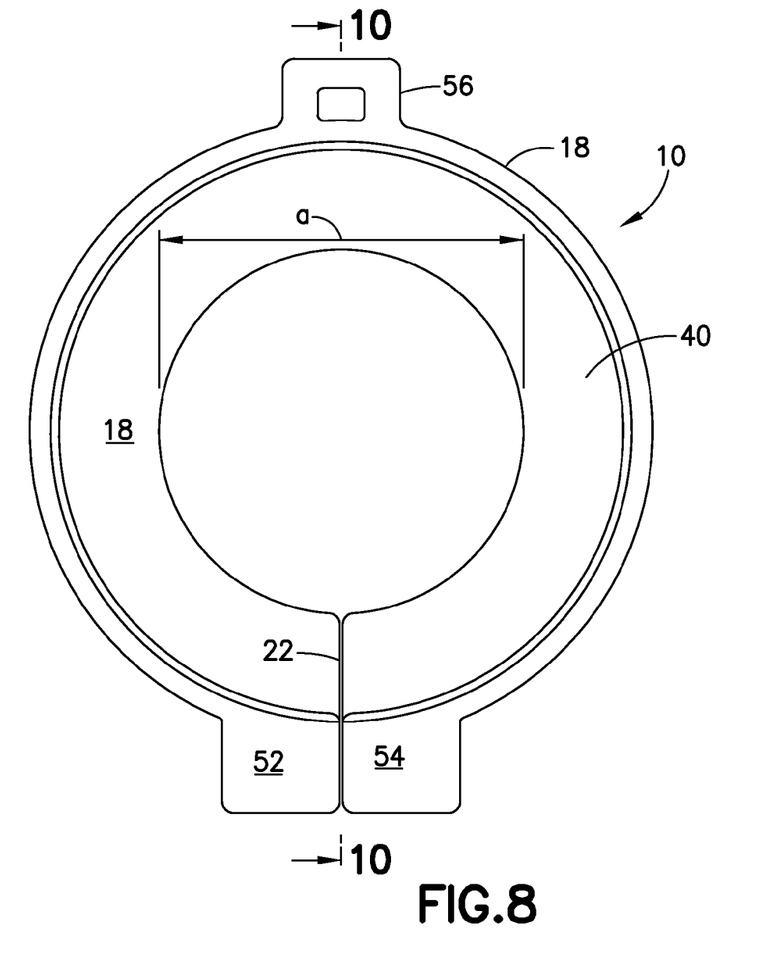
FIG. 8 is a rear end elevational view of the guide device.
Figure 9:
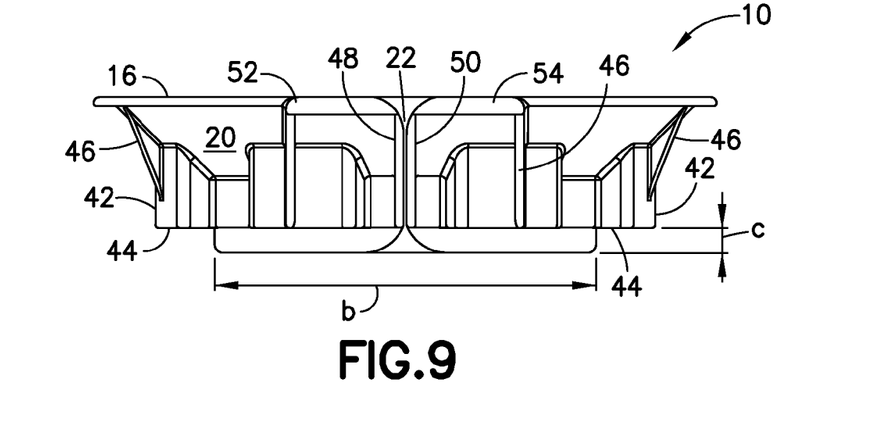
FIG. 9 is a bottom plan view of the guide device.
Figure 10:
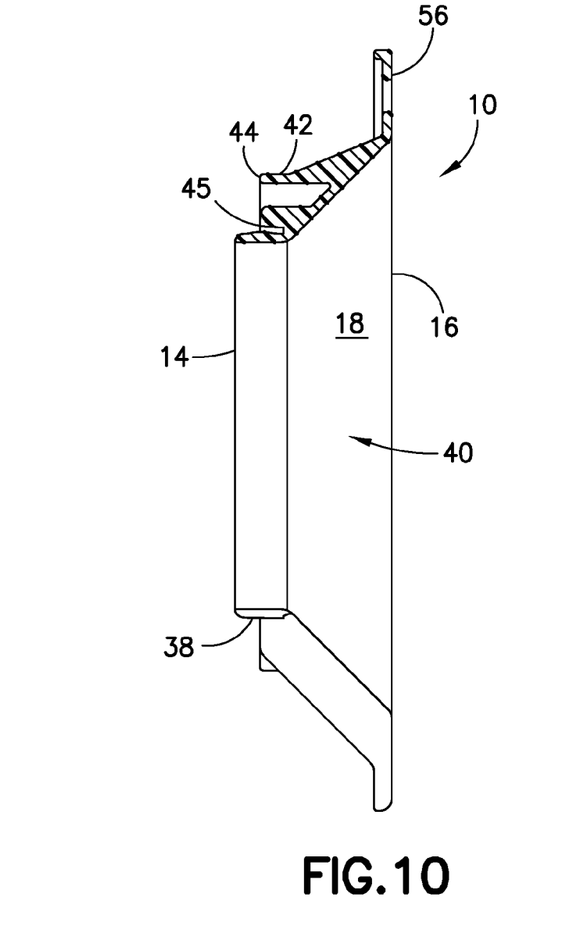
FIG. 10 is a cross-sectional view taken along line 10-10 in FIG. 8.

The generally tubular sidewall 12 of the guide device 10 defines a short substantially cylindrical portion 38 adjacent to the front end 14. As shown in FIG. 8, the cylindrical portion 38 has an inside diameter "a" sufficiently large to accommodate the bundle of wires 34 of the wiring harness 32 therein. Additionally, the cylindrical portion 38 has an outside diameter "b" substantially equal to the inside diameter of the aperture 26 in the panel 24 and a length "c" slightly greater than the thickness of the panel 24, as shown in FIG. 9. Thus, the cylindrical portion 38 can be inserted through the aperture 26 in the panel 24 and will be retained frictionally therein.

The generally tubular sidewall 12 of the guide device 10 further includes a frustoconical portion 40 extending from the cylindrical portion 38 to the rear end 16 of the tubular sidewall 12. The frustoconical portion 40 is oriented so that the diameter at the rear end 16 of the tubular sidewall 12 is much larger than the diameter of the cylindrical portion 38 at the front end 14 of the tubular sidewall 12. The much larger diameter of the frustoconical portion 40 at the rear end 16 of the tubular sidewall 12 facilitates guiding the wiring harness 32 through the guide device 10 and hence through the aperture 26 in the panel 24.

A plurality of supports 42 project out from the outer circumferential surface 20 at a position adjacent to the cylindrical portion 38 and continuing rearward onto the frustoconical portion 40. Each support 42 has a hollow interior 43 to avoid large masses of resin that could cause sink marks to form during cooling. The hollow interiors 43 open toward the front end 14 and optionally can be fit with magnets M to permit magnetic attachment of the guide device 10 to the metal panel 24. Each support 42 has a stop surface 44 facing toward the front end 14 of the tubular sidewall 12 and lying in a radial plane substantially perpendicular to an axis of the tubular sidewall 12. The stop surfaces 44 limited the amount of insertion of the cylindrical portion 38 into the aperture 26 in the panel 24 and prevent tipping or skewing of the guide device 10 relative to the panel 24. An annular groove 45 is formed inward of the supports 42 and outward of the cylindrical portion 38. The annular groove 45 is disposed and dimensioned to receive the burring wall 28.

Reinforcing webs 46 project outward and rearward from outer surfaces of the supports 42 toward the rear end 16 of the tubular sidewall 12. The reinforcing webs 46 lie in radially aligned planes and function to prevent deformation of the frustoconical portion 44 of the guide device 10 in response to forces exerted thereon during attempts to insert the wiring harness 32 through the guide device 10.

First and second abutting walls 48 and 50 project radially out from the outer circumferential surface 20 at locations aligned with the edges defined by the slit 22. Reinforcing panels 52 and 54 extend from the abutting walls 48 and 50 respectively to the reinforcing webs 46 closest to the slit 22. The reinforcing panels 52 and 54 also define convenient and necessary surfaces for receiving manual pushing forces when pushing the guide device 10 into the aperture 26 in the panel 24. The reinforcing webs 46 and the abutting walls 48 and 50 ensure structural rigidity in response to pushing forces on the reinforcing panels 52 and 54. The abutting walls 48 and 50 prevent the sidewall 12 from collapsing, coiling or twisting due to pressure from the wiring harness 32. More particularly, the abutting walls 48 and 50 will abut against one another in substantially face-to-face contact to prevent one part of the sidewall 12 adjacent the slit 22 from sliding under or over the opposed part of the sidewall 12 on the opposite side of the slit 22.

A storage loop 56 projects from the rear end 16 of the sidewall 12 at a position diametrically opposite the slit 22 and can receive a flexible strap. The storage loop 56 enables the guide device 10 to be mounted on a hook or fixture at a location along an assembly line in proximity to the location where the wiring harness 32 must be guided through the aperture 26 in the panel 24. Additionally, a flexible strap engaged in the storage loop 56 can be very helpful for removing the guide device from the panel 24 and then from the wiring harness in one motion. This removal is facilitated by the disposition of the storage loop 56 diametrically opposite the slit 22. Furthermore, the storage loop 56 can receive pushing forces when mounting the guide device to the panel 24.

Figure 1:
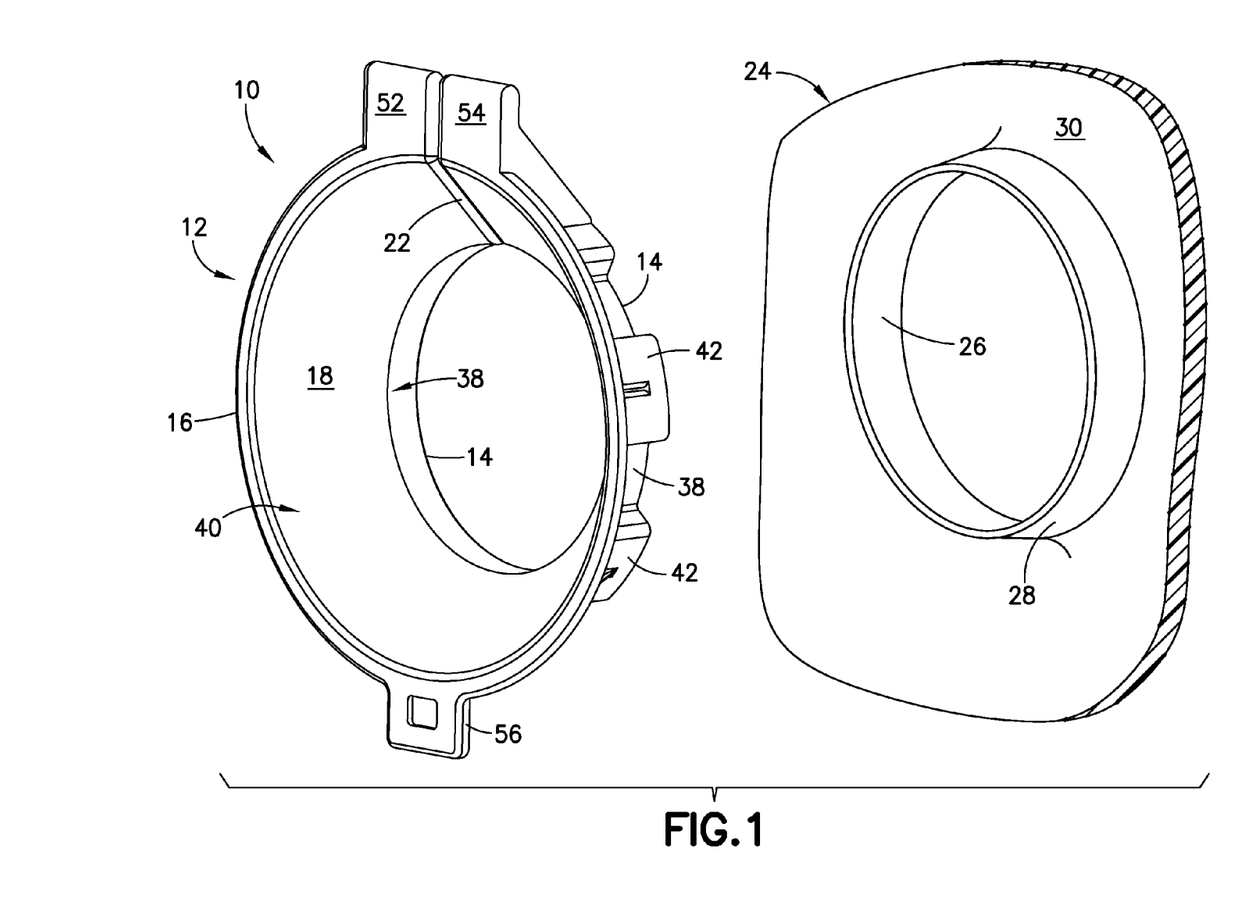
FIG. 1 is an exploded perspective view of a panel with an aperture and a guide device for guiding a wiring harness through the aperture in the panel and showing a cross-sectionally large rear end of the guide device.
Figure 2:
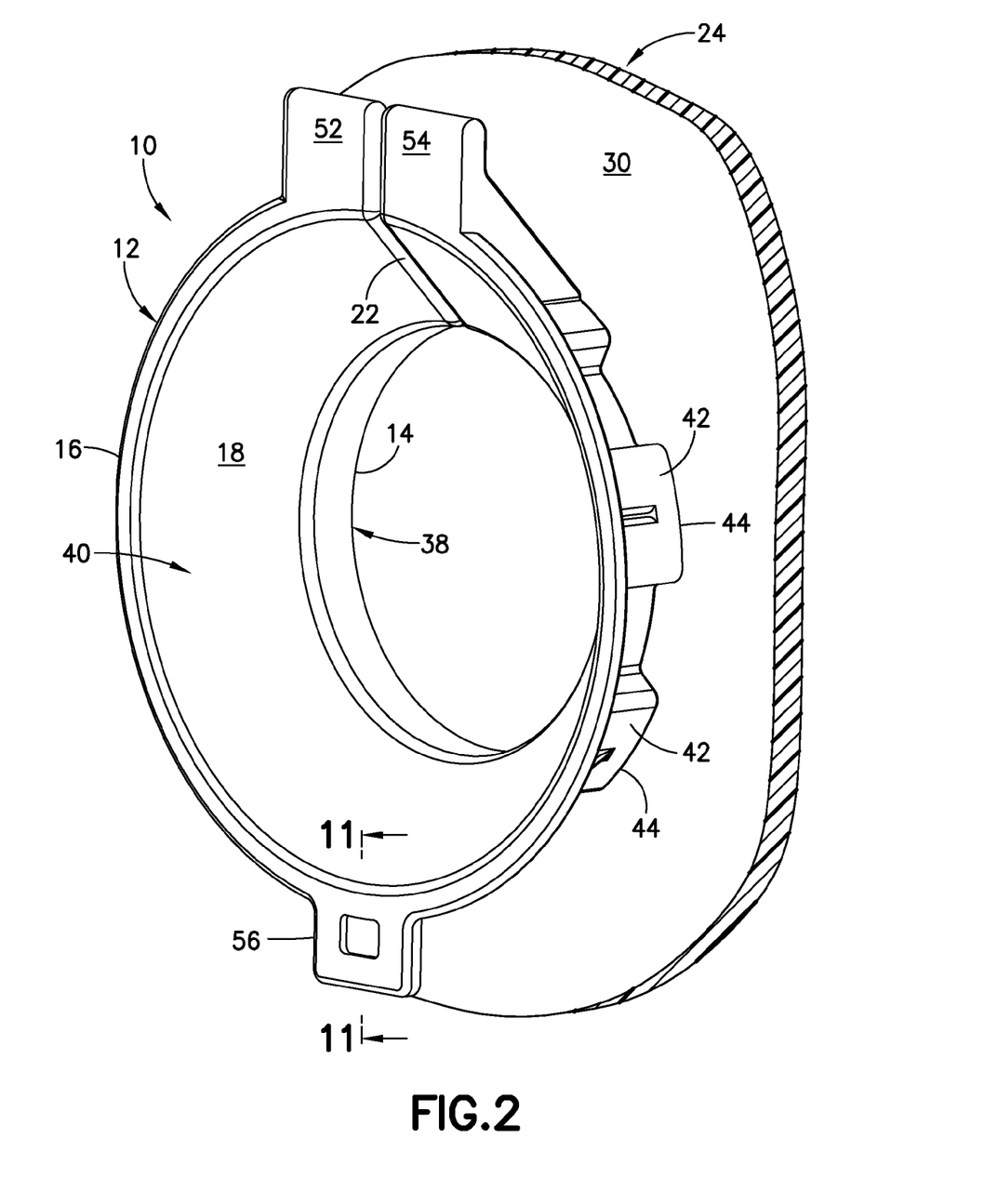
FIG. 2 is a perspective view of the guide device mounted to the panel at the aperture therein.
Figure 3:
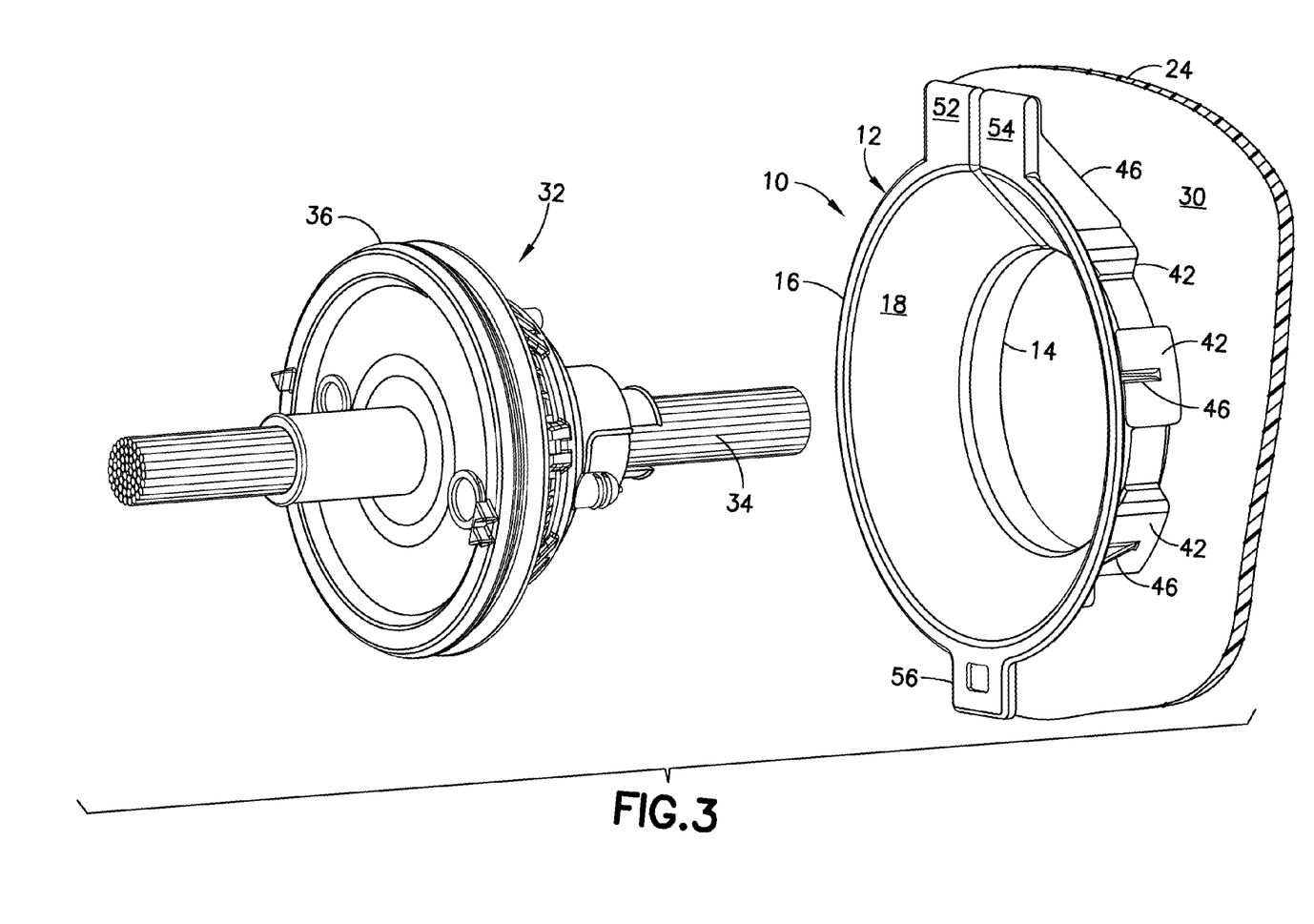
FIG. 3 is an exploded perspective view showing a wiring harness being guided toward the guide device for insertion into the aperture in the panel.
Figure 4:
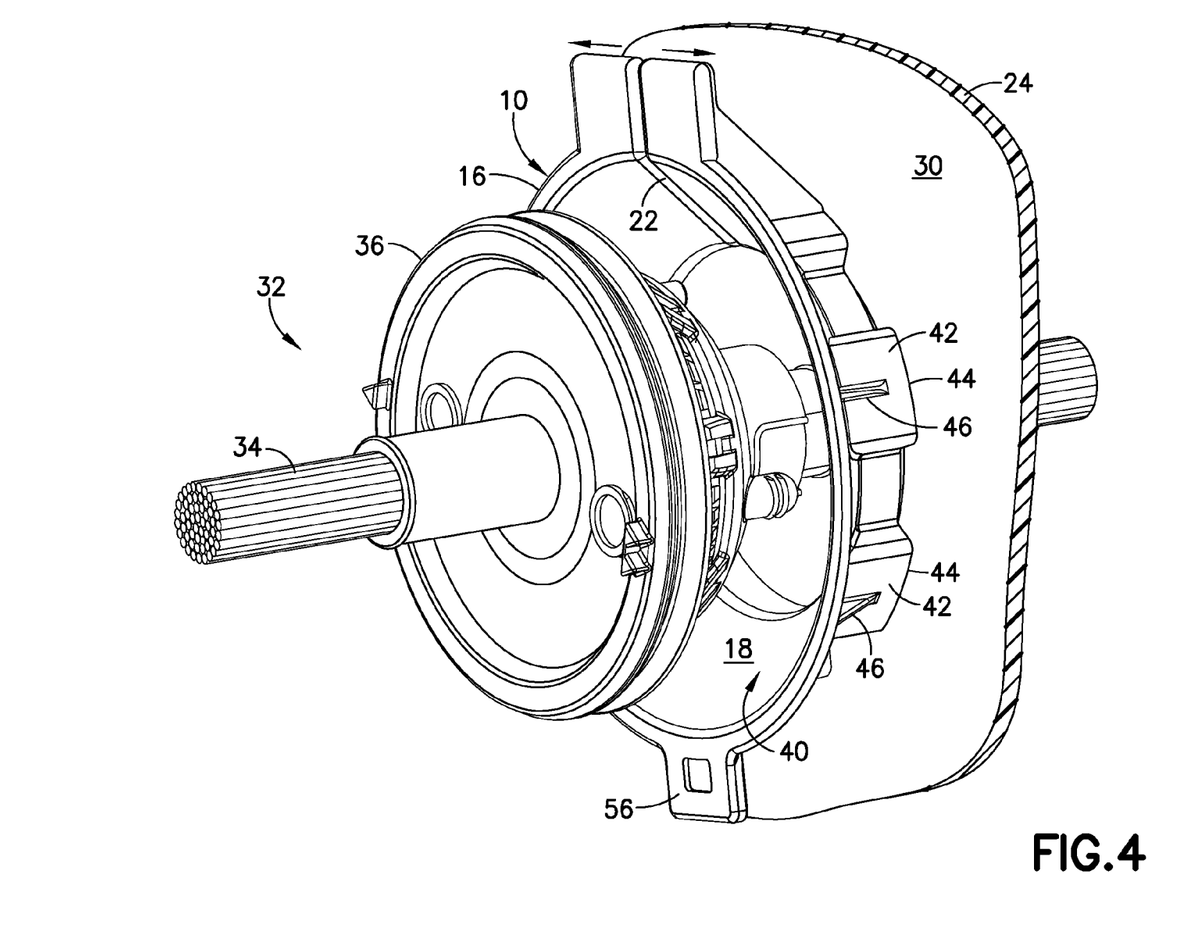
FIG. 4 is a perspective view showing part of the wiring harness extending through the aperture in the panel with the guide device still mounted to the panel at the aperture.
Figure 5:
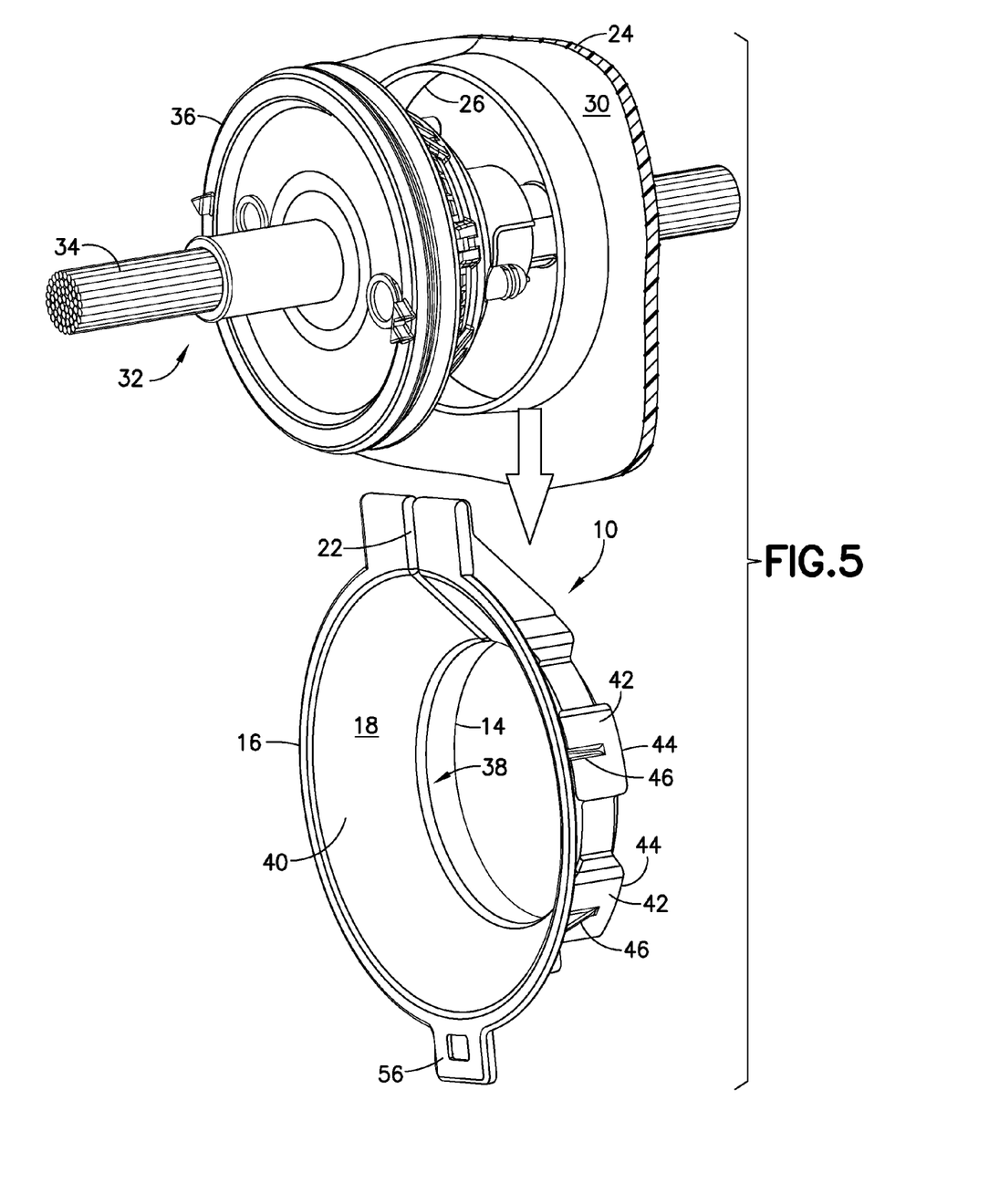
FIG. 5 is an exploded perspective view showing the guide device being separated from the panel and the wiring harness.
Figure 6:
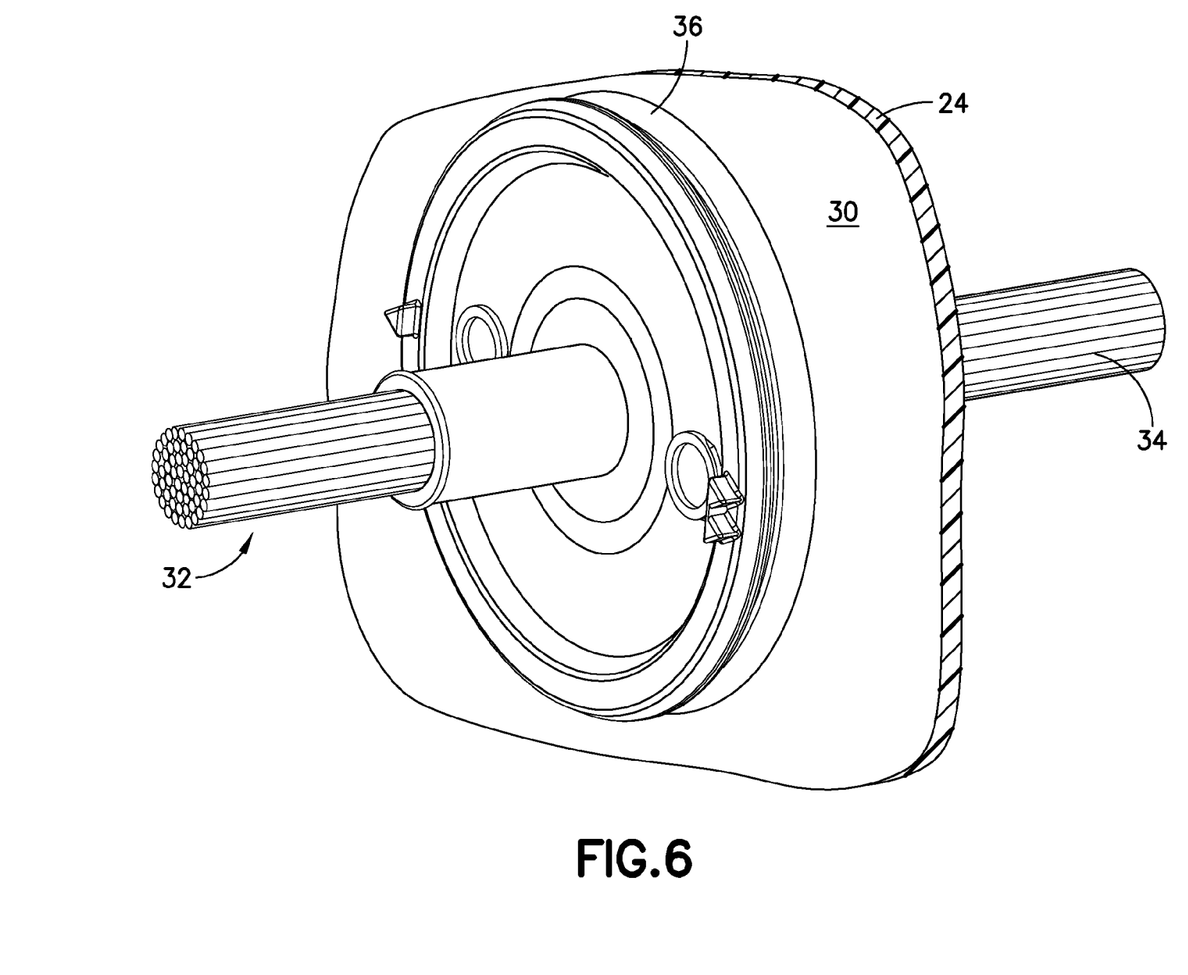
FIG. 6 is a perspective view of the wiring harness fully mounted to the panel with the guide device removed therefrom.
Figure 7:
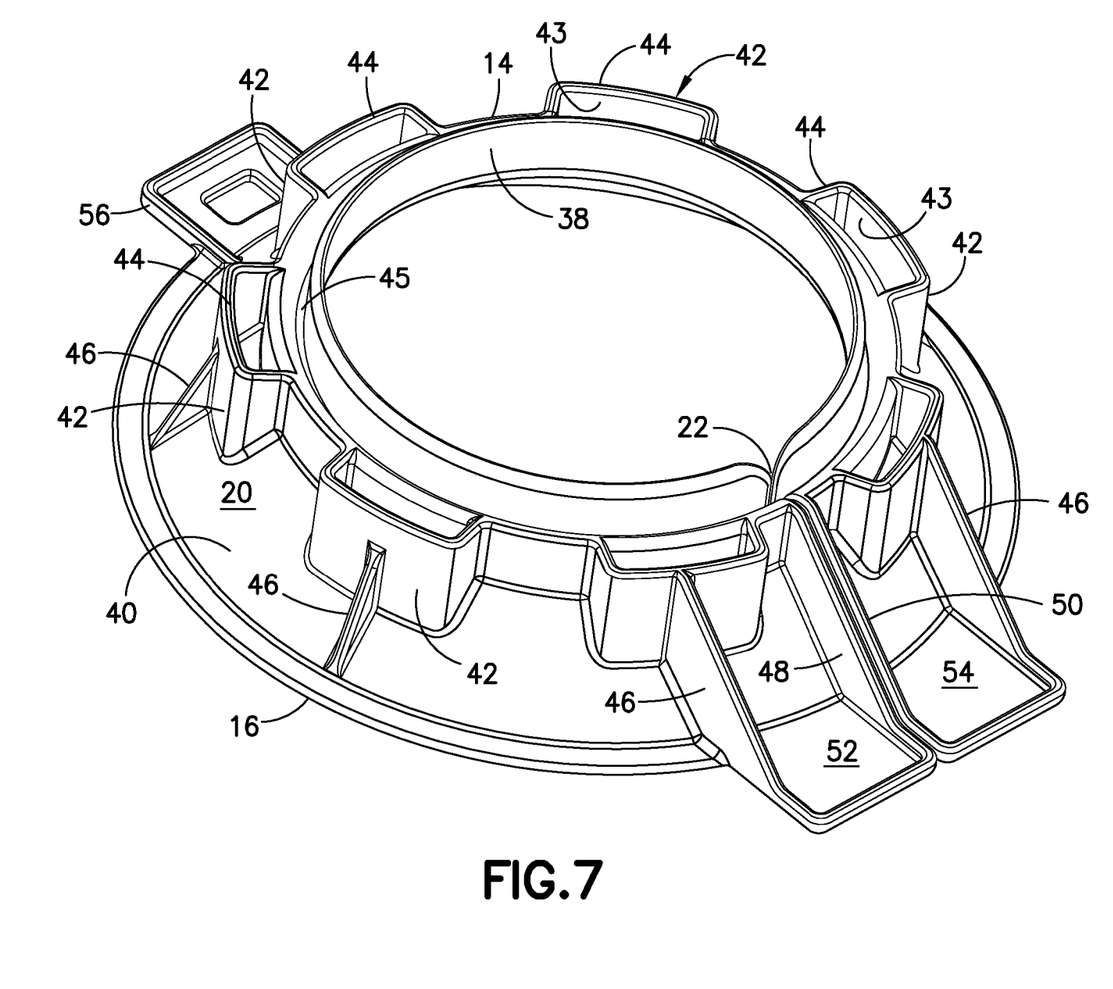
FIG. 7 is a perspective view of the guide device showing the cross-sectionally small end thereof.

The guide device 10 is used as illustrated in FIGS. 1-6 more particularly, the front end 14 of the sidewall 12 is advanced toward the panel 24, as shown in FIG. 1 with the cylindrical portion 38 aligned with the aperture 26 in the panel 24. The cylindrical portion 38 then is advanced into the aperture 26, as shown in FIG. 2. Additionally, the burring wall 28 advances into the groove 45, as shown in FIG. 11. The outside diameter "b" of the cylindrical portion 38 corresponds to the inside diameter of the aperture 26. As a result, the guide device 10 is held frictionally in place on the panel 24 including the burring wall 28 with the rear end 16 of the sidewall 12 projecting from the panel 24 and with the frustoconical portion 40 opening widely at farther distances from the panel 24. The wiring harness 32 then is advanced toward the rear end 16 of the sidewall 12, as shown in FIG. 3, and is guided through the aperture 24 by the frustoconical shape adjacent to the rear end 16, as shown in FIG. 4. Once the bundle of wires 34 and the connectors mounted thereon have passed through the aperture 36, the guide device 10 is pulled rearward so that the cylindrical portion 38 disengages from the aperture 26 in the panel 24 and from the burring wall 28. The sidewall 12 then is biased into an open direction indicated by the arrows in FIG. 4 to widen the slit 22 sufficiently to disengage the guide device 10 from the wiring harness 32. The guide device 10 then is moved transversely away from the wiring harness 32, as indicated by the arrow in FIG. 5. The grommet 36 then is advanced along the wire bundle 34 and is engaged with the panel 24 adjacent the aperture 26 to provide sealing between the wiring harness 32 and the panel 24, as shown in FIG. 6. The guide device 10 then can be stored via the storage loop 56 for reuse as needed.

Figure 12:
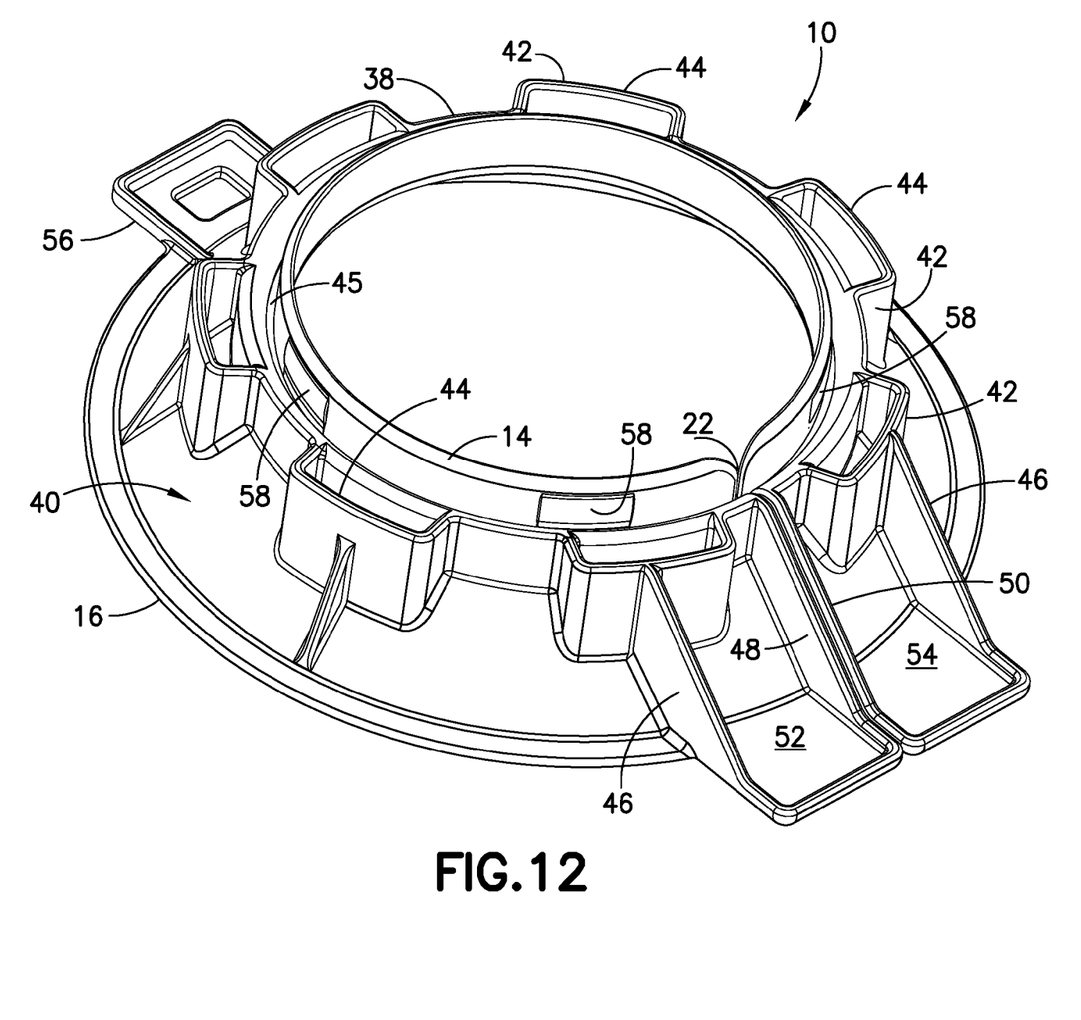
FIG. 12 is a perspective view of the guide device showing similar to FIG. 7, but showing an embodiment with projections formed at the small diameter front end thereof.

Retention of the guide device 10 on the panel 24 also can be enhanced by bumps 58 at space apart locations on the cylindrical portion 38 of the sidewall 12, as shown in FIG. 12. The bumps 58 are dimensioned to require resilient deformation during mounting of the guide device 10 on the panel 24 so that the guide device 10 is held on the panel 24 between the bumps 58 and the stop surfaces 44 of the supports 42 to further enhance retention of the guide device 10 on the panel 24.

The invention has been described with respect to preferred embodiment. However, changes can be made without departing from the scope of the invention as defined by the appended claims. Examples of such changes are described below and also are within the scope of the invention.

An annular rib may extend around the cylindrical portion 38 in proximity to the first end 14 of the sidewall 12 in place of the bumps 58 to achieve a snapped engagement of the guide device with the panel 24.

The supports 42 and the stop surface 44 may be replaced with an annular step to limit the amount of insertion of the guide device 10 into the aperture 26 in the panel 24.

The abutting walls 48 and 50 need not be aligned in a radially extending plane and can extend in other directions adjacent to the slit 22.

One or more magnets optionally may be included in at least one of the hollow portions 43 of the supports 42 to hold the device 10 on a magnetic panel 24. The magnet may be retained frictionally or adhesively.

The device can be divided diametrically and can be assembled and disassembled relative to the wiring harness.

We claim:

1. A guide device for guiding a wiring harness through an aperture in a panel, the panel having a substantially cylindrical burring wall surrounding the aperture, the cylindrical burring wall having inner and outer circumferential surfaces with specified inside and outside diameters, the guide device comprising: a substantially tubular sidewall having opposite front and rear ends, portions of the sidewall adjacent the front end defining substantially cylindrical inner and outer circumferential walls and a forwardly open annular groove between the inner and outer circumferential walls, the inner circumferential wall being dimensioned to fit in and engage the inner circumferential surface of the burring wall and the outer circumferential wall being dimensioned to fit on and engage the outer circumferential surface of the burring wall for retaining the guide device removably on the panel, the sidewall flaring outwardly toward the rear end to define a substantially frustoconical portion between the substantially cylindrical portion and the rear end, a plurality of circumferentially spaced supports projecting out from the outer circumferential surface of the frustoconical portion and having stop surfaces facing toward the front end, the stop surfaces being between the front end and the frustoconical portion, the supports being dimensioned to limit insertion of the front end into the aperture in the panel, a slit being formed through the sidewall and extending continuously from the front end of the sidewall to the rear end thereof, and first and second abutting walls projecting radially out beyond the outer circumferential surface of the frustoconical portion at positions adjacent opposite sides of the slit for preventing the sidewall from collapsing inwardly at the slit.

2. The guide device of claim 1, wherein the sidewall is formed from a material that is sufficiently resiliently deformable to widen the slit sufficiently to remove the guide device transversely from the wiring harness.

3. The guide device of claim 2, wherein the sidewall is formed unitarily from a synthetic resin.

4. The guide device of claim 1, wherein the abutting walls are in substantially surface to surface contact with one another when the slit is closed.

5. The guide device of claim 1, wherein the stop surfaces are substantially coplanar.

6. The guide device of claim 1, further comprising reinforcing webs projecting from the supports toward areas of the sidewall adjacent the rear end.

7. The guide device of claim 1, wherein the supports have hollow interiors that are open facing toward the front end.

8. The guide device of claim 1, further comprising circumferentially spaced bumps formed on an outer circumferential surface of the sidewall in proximity to the front end, the bumps being dimensioned to resiliently engage a surface of the panel adjacent the aperture.

9. The guide device of claim 7, further comprising a magnet mounted in the hollow interior of at least one of the supports for releasably holding the guide on the panel.

* * * * *